(12) United States Patent
Takemoto (10) Patent No.: US 7,639,380 B2
(45) Date of Patent: Dec. 29, 2009

(54) PRINT ORDER SYSTEM, PRINTING SYSTEM, ORDER TERMINAL, AND PROGRAMS THEREFOR

(75) Inventor: Fumito Takemoto, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 529 days.

(21) Appl. No.: 10/228,949

(22) Filed: Aug. 28, 2002

(65) Prior Publication Data

US 2003/0053121 A1   Mar. 20, 2003

(30) Foreign Application Priority Data

Aug. 28, 2001   (JP)   ............. 2001-257167

(51) Int. Cl.
*G06F 15/00* (2006.01)
*G06F 15/16* (2006.01)

(52) U.S. Cl. .................. 358/1.15; 709/203

(58) Field of Classification Search ........... 358/1.15, 358/1.9, 504, 506, 402, 302, 1.18, 435, 468, 358/468.4; 709/203, 206, 217, 218, 246; 348/239, 14.02, 231.99; 705/1, 14, 26, 59, 705/402; 455/445, 403; 707/1, 3, 10, 20
See application file for complete search history.

(56) References Cited

U.S. PATENT DOCUMENTS

| 6,011,547 | A | 1/2000 | Shiota et al. | |
| 6,198,526 | B1 | 3/2001 | Ohtsuka | |
| 6,727,973 | B2 * | 4/2004 | Mizumo | 355/40 |
| 6,781,724 | B1 * | 8/2004 | Szajewski et al. | 358/487 |
| 7,116,441 | B1 | 10/2006 | Matsuoka | |
| 2001/0003180 | A1 | 6/2001 | Sakai et al. | |
| 2005/0065857 | A1 | 3/2005 | Sakai et al. | |
| 2005/0174591 | A1 * | 8/2005 | Sowinski et al. | 358/1.9 |

FOREIGN PATENT DOCUMENTS

JP   10-078620   3/1998

(Continued)

OTHER PUBLICATIONS

Nikkei Electronics, "Seiko Epson Determined Image Data Exchange Specification Between Digital Camera And Printer For Printing In Color Space And Manipulation Condition Specified By the Camera", Mar. 12, 2001, vol. 791, p. 27.

(Continued)

*Primary Examiner*—Saeid Ebrahimi Dehkordy
(74) *Attorney, Agent, or Firm*—Sughrue Mion, PLLC (57) ABSTRACT

The desired finish of a user can be easily and securely reflected in the finish of printed matter at the time of placing an order via a network. A CD-R recorded with viewer software capable of setting image processing conditions is provided to the user from a DPE store. When the user places an order by using the viewer software, processed images having been subjected to image processing regarding density, white balance, tones, and sharpness at different levels are displayed for image data to be printed. The user selects one of the processed images having the desired finish for each of the types of image processing, and the image processing conditions therefor are recorded in a header of the image data. The DPE store carries out the image processing on the image data according to the image processing conditions that are sent thereto and prints processed image data.

9 Claims, 7 Drawing Sheets

FOREIGN PATENT DOCUMENTS

| | | |
|---|---|---|
| JP | 10-191246 | 7/1998 |
| JP | 11-149131 | 6/1999 |
| JP | 2000-209449 A | 7/2000 |
| JP | 2001-094799 A | 4/2001 |
| JP | 2001-169266 A | 6/2001 |

OTHER PUBLICATIONS

Nikkei Electronics, News Reports: Printer Without Personal Computer Giving Up The Name And Trying To Vindicate, Seiko Epson Aims Distinction By New Standard, Mar. 26, 2001, p. 41-42.

* cited by examiner

PRINT ORDER SYSTEM, PRINTING SYSTEM, ORDER TERMINAL, AND PROGRAMS THEREFOR

BACKGROUND OF THE INVENTION

1. Field of the Invention

The present invention relates to a print order system, a printing system, and an order terminal for placing a print order regarding image data via a network. The present invention also relates to programs that cause computers to execute procedures carried out in the printing system and in the order terminal.

2. Description of the Related Art

There have been known digital photograph service systems for carrying out various types of digital photograph services such as storing photographs obtained by users in image servers after digitization thereof, recording the photographs in CD-Rs to be provided to the users, printing images photographed by users with digital cameras, and receiving orders for additional prints. As one form of such digital photograph service systems, a printing service system for receiving print orders via a network such as the Internet has also been proposed.

In such a printing service system, a user installs viewer software to his/her personal computer, which acts as a user terminal, for reproducing image data recorded in a CD-R or obtained by a digital camera. The user reproduces images represented by the image data, and generates order information describing the content of an order by using an ordering function built-in to the viewer software if the user wishes to place an order. The user transfers the order information and the image data representing the images to be printed to an order reception server installed at a service center for receiving the order from the user terminal via the network such as the Internet. The order reception server transfers the order information and the image data to a print server installed at a large-scale laboratory for processing the order. Printed matter such as additional prints, picture postcards, or a photograph album is generated in the laboratory based on the order information.

The printed matter generated in the above manner is delivered or mailed to an agency specified by the user at the time of placing the order. In this manner, the user can receive the printed matter by paying a charge at the agency. The user can designate the agency at the time of placing the order, and a desired store or the like close to a place of residence or employment of the user is generally designated as the agency. The image data and the order information are transferred from the order reception server to the laboratory in collaboration with the agency designated by the user.

The order information herein referred to is information such as a processing number for specifying the content of a printing service (generation of ordinary prints or picture postcards or the like), an image number for specifying a photograph (a number representing an image data file), a print size, a quantity of prints, specification of printing paper (such as glossy or non-glossy), thickness of the printing paper, the content of photographic processing, and trimming specification, for example. The order information further includes information regarding the name, the address, the zip code and the phone number of the user, for example.

The printed matter generated in the printing service is delivered or mailed to the agency designated by the user at the time of placing the order, and the user receives the printed matter at the agency, as has been described above. If the agency installs a server for receiving the print order and the image data as well as a printer to print the image data, the agency can function as a laboratory. When the agency has the function of a laboratory, delivery of the printed matter to the agency becomes unnecessary. Therefore, although the agency is small as a laboratory, the time necessary for providing the user with the printed matter can be shortened.

Meanwhile, when the printed matter is generated, various types of image processing such as density conversion processing, white balance processing, gradation conversion and sharpness processing are carried out on the image data in order to improve the quality of the printed matter. Therefore, a method of carrying out appropriate image processing on image data has also been proposed, in order to generate printed matter of higher quality (Japanese Unexamined Patent Publication No. 10(1998)-191246). In this method, photographing information such as use of flash and the type of lighting is added to image data obtained by a digital camera, and image processing is carried out appropriately on the image data with reference to the photographing information added to the image data.

Furthermore, a system for directly outputting image data obtained by a digital camera from a printer without involving a personal computer has also been proposed (Nikkei Electronics 2001.3.12 (No. 791) p. 27, Nikkei Electronics, 2001.3.26 p. 41-42). In such a conventional system, a photographer inputs a printing command that reflects his/her desired finish by using a digital camera. The printing command includes a $\gamma$ value used for printing, a method of conversion into a color space adopted at the time of printing, adjustments for lightness, saturation, sharpness, and color balance, and a photographing mode (such as portrait mode or landscape mode), for example. The printing command is recorded in a header of the image data, and the image processing is carried out on the image data based on the printing command that is read with the image data by the printer. In this manner, a print reflecting the desired finish of the photographer can be obtained.

However, in the method described in Japanese Unexamined Patent Publication No. 10(1998)-191246, the image processing is carried out on the image data in order to cause the image data to be close to target reproduction values set in advance, although the image processing is based on the photographing information. Therefore, a print reflecting the desired finish of a photographer cannot be obtained. Moreover, in the conventional system described in Nikkei Electronics, input of a printing command reflecting the desired finish of a photographer for each image is extremely troublesome by using a digital camera, although a print can be obtained with the finish reflecting the desired finish of the photographer. In addition, in the case where the photographer has forgotten to change the photographing mode to the landscape mode at the time of photographing a landscape after photography in the portrait mode, the image processing appropriate for the portrait mode may be carried out on the image data because of the printing command indicating the portrait mode, although the image data represents the landscape. Furthermore, since a liquid crystal display monitor attached to a digital camera has a small screen that is not easy to see, confirming the finish of a print with a digital camera is difficult.

SUMMARY OF THE INVENTION

The present invention has been conceived based on consideration of the above circumstances. An object of the present invention is therefore to enable a photographer to place an order for a print reflecting a desired finish thereof with an easy operation.

A print order system of the present invention comprises:

an order reception server installed at a printing service provider having a photographic printer to print image data, and an order terminal connected to the order reception server via a network. The order reception server is used for receiving the image data and order information regarding the image data via the network. The order terminal is used for generating the order information and for placing a print order regarding the image data by transferring the order information to the order reception server while directly accessing the order reception server. In the print order system of the present invention, the order terminal generates processed image data by carrying out one or more types of image processing at different levels on the image data regarding which the print order is placed, by using different image processing conditions. The order terminal displays processed images represented by the processed image data on a display means such as a CRT monitor or a liquid crystal display monitor, for the type or each of the types of the image processing. The order terminal then receives selection of a desired one of the processed images for the type or each of the types of the image processing, and sends to the order reception server the image processing condition or conditions used for generating the desired processed image or images that have been selected, together with the order information and the image data. The order reception server receives the image processing condition or conditions for the type or types of the image processing. The order reception server is connected to image processing means for carrying out the image processing on the image data based on the image processing condition or conditions for the type or types of the image processing.

The printing service provider refers to any service provider related to printing, such as a DPE store at which a user can receive printed matter, or a laboratory dedicated to printing without having a storefront and providing printed matter by delivery or mail.

The order reception server refers to a server computer installed at the printing service provider and is connected to the photographic printer and a controller for controlling the photographic printer and the order reception server. The order reception server is always connected to the network.

The order terminal can be a network-connectable personal computer owned by a user who places the print order, or a network terminal installed at the printing service provider for placing the print order.

As the image data to be printed, any image data can be used, such as image data obtained by the user with a digital camera, or image data digitized by a printing service provider based on photographs obtained by the user and provided to the user in the form of a CD-R. The image data are transferred from the order terminal to the order reception server together with the order information.

The printing order specifies not only ordinary printing in which the image data are printed by the photographic printer, but also printing for generating a picture postcard or a calendar, and printing on a T-shirt, a mug cup, a jigsaw puzzle, or a watch face, for example. In the case where the printing service provider does not have equipment for picture postcard generation or the like, the print order therefor is transferred to another printing service provider in collaboration with the printing service provider.

The printed matter generated according to the order information, such as prints and picture postcards, may be provided directly to the user at the printing service provider, or by delivery or mail.

As the image processing, density conversion processing, white balance processing, gradation conversion, and sharpness processing can be used, for example. However, the image processing is not limited to the image processing of these types.

The image processing conditions refer to conditions for determining degrees of the image processing. For example, the image processing condition for density conversion processing determines the density of each of the processed images. For white balance processing, gradation conversion, and sharpness processing, the image processing conditions determine the degrees of white balance, gradation, and sharpness, respectively.

The image processing carried out in the order terminal corresponds to the image processing carried out on the image data by the printing service provider. If the number of the types of image processing carried out in the printing service provider is only one, the only one type of image processing is carried out in the order terminal. If the number of the types of the image processing carried out at the printing service provider is more than one, the plurality of types of image processing is carried out in the order terminal. Only a portion of the types of the image processing carried out by the printing service provider may be carried out in the order terminal. In this case, the image processing is carried out on the image data at the printing service provider by using a predetermined image processing condition for each of the remaining types of image processing that is not carried out in the order terminal.

In the print order system of the present invention, generation of the processed image data, display of the processed images, reception of the selection of the desired processed image for the type of or each of the types of image processing, and transfer of the image processing condition or conditions are carried out by a program installed in the order terminal. The program causes a computer to execute the procedures of generation of the processed image data, display of the processed images, reception of the selection of the desired processed image, and transfer of the image processing condition or conditions.

The program may be provided to the user by being recorded in a computer-readable recording medium such as a CD-R, an FD, or a DVD. Alternatively, the program may be provided to the user by downloading the program to the order terminal. The order terminal can generate the processed image data, display the processed images, receive the selection of the desired processed image, and transfer the image processing condition or conditions without special equipment therefor, if the user installs the program to the order terminal.

Access information for accessing the order reception server of the printing service provider is preferably recorded in the recording medium storing the program therein. As the access information, the IP address or the URL of the order reception server, the address, the zip code, or the phone number of the printing service provider can be used, for example. It is preferable for the access information to be input to the program at the time of installation of the program so that the order reception server of the printing service provider is automatically accessed by the order terminal, based on the access information at the time of transfer of the order information.

The recording medium is provided to the user at the time of purchase of a digital camera by the user, when the user visits the printing service provider, or on the street, for example.

The user, who has installed the program, places the print order with the printing service provider from which the user received the recording medium storing the program therein. Therefore, the printing service provider can induce the user to use the printing service provider.

The user may obtain recording media of the same program from a plurality of printing service providers and may install the program to his/her personal computer. In this case, the respective printing service providers may be added at the time of installation of the program so that one of the printing service providers can be selected at the time the order information is transferred. In this manner, choice of the printing service providers can be widened. Alternatively, the printing service provider may be overwritten at each installation of the program so that only the order reception server of the printing service provider corresponding to the program installed last can be accessed.

In the print order system of the present invention, it is preferable for the processed image data to be generated by carrying out the type or types of image processing on reduced image data representing a reduced image of an image represented by the image data. In this manner, the amount of data can be reduced and the operation time can be shortened.

In the print order system of the present invention, it is preferable that a color reproduction range of the display means substantially matches a color reproduction range of the photographic printer. In this manner, a difference between colors in the processed images displayed on the display means and colors in the printed matter can be suppressed.

An order terminal of the present invention is connected via a network to an order reception server capable of receiving order information regarding image data. The order reception server is installed at a printing service provider having a photographic printer to print the image data. The order terminal generates the order information, and places a print order regarding the image data by transferring the order information to an order reception server installed data specific printing service provider while directly accessing the order reception server. The order terminal generates processed image data by carrying out one or more types of image processing at different levels on the image data regarding which the print order is placed, by using different image processing conditions. The order terminal displays processed images represented by the processed image data on display means for the type of or each of the types of the image processing. The order terminal then receives selection of a desired one of the processed images for the type of or each of the types of the image processing, and sends to the order reception server the image processing condition or conditions for the processed image or images that have been selected, together with the order information and the image data.

In the order terminal of the present invention, generation of the processed image data, display of the processed images, reception of the selection of the desired processed image for the type or each of the types of the image processing, and transfer of the image processing condition or conditions are preferably carried out by a program installed in the order terminal. The program causes a computer to execute the procedures of generation of the processed image data, display of the processed images, reception of the selection of the desired processed image for the type or each of the types of the image processing, and transfer of the image processing condition or conditions.

In the order terminal of the present invention, it is preferable for the processed image data to be generated by carrying out the type or types of the image processing on reduced image data representing a reduced image of an image represented by the image data.

In the order terminal of the present invention, it is preferable that a color reproduction range of the display means substantially matches a color reproduction range of the photographic printer.

A printing system of the present invention is a printing system installed at a printing service provider, and the printing system comprises:

a photographic printer for printing image data; and an order reception server capable of directly receiving the order information generated by the order terminal of the present invention via a network. The printing system further comprises image processing means for carrying out the image processing on the image data based on the image processing condition or conditions for the type or types of the image processing.

The procedures carried out in the order terminal and in the printing system of the present invention may be provided as programs that cause computers to execute the procedures.

According to the present invention, the order terminal carries out at least one type of image processing at different levels on image data to be printed while using different image processing conditions, and generates processed image data that have been subjected to the type or types of image processing. The processed image data are then displayed on the display means. An operator (generally a user) of the order terminal can select one of the processed images that has been subjected to the image processing of a desired one of the levels. In the case where the number of the types of the image processing is not one, the desired processed image can be selected for each of the types of image processing. The selection of the desired processed image is received for the type or each of the types of image processing and the image processing condition for the selected processed image is sent to the order reception server together with the order information. In the case where the number of the types of the image processing is not one, the image processing condition is sent to the order reception server for each of the types of image processing.

At the printing service provider, the image processing means carries out the image processing on the image data based on the image processing condition or conditions that have been received by the order reception server. The image data after the image processing are then printed by the photographic printer.

As has been described above, in the present invention, the order terminal displays the processed images that have been subjected to the image processing of different levels. Therefore, an operator can confirm the finish of a print by using the display means. Since the display means of the order terminal is larger than a liquid crystal display monitor of a digital camera, the finish of the image data can be confirmed easily. Furthermore, since the processed images having been subjected to the image processing of different levels are displayed, the operator can easily select the processed image that has been subjected to the image processing at the desired level, for the type or each of the types of the image processing. Moreover, since the image processing condition or conditions for the selected processed image or images are transferred to the order reception server and the image processing is carried out on the image data according to the image processing condition or conditions, the printed matter can reflect the desired finish of the operator.

For the printing service provider, the image processing is simply carried out based on the image processing condition or conditions that have been sent thereto. Therefore, an operator at the printing service provider does not need to carry out complex image processing. Consequently, a burden on the operator becomes lighter and the labor cost can be saved. Moreover, since the operation time for the image processing can be shortened, the cost for generating the printed matter can also be reduced.

DESCRIPTION OF THE PREFERRED EMBODIMENT

Figure 1:
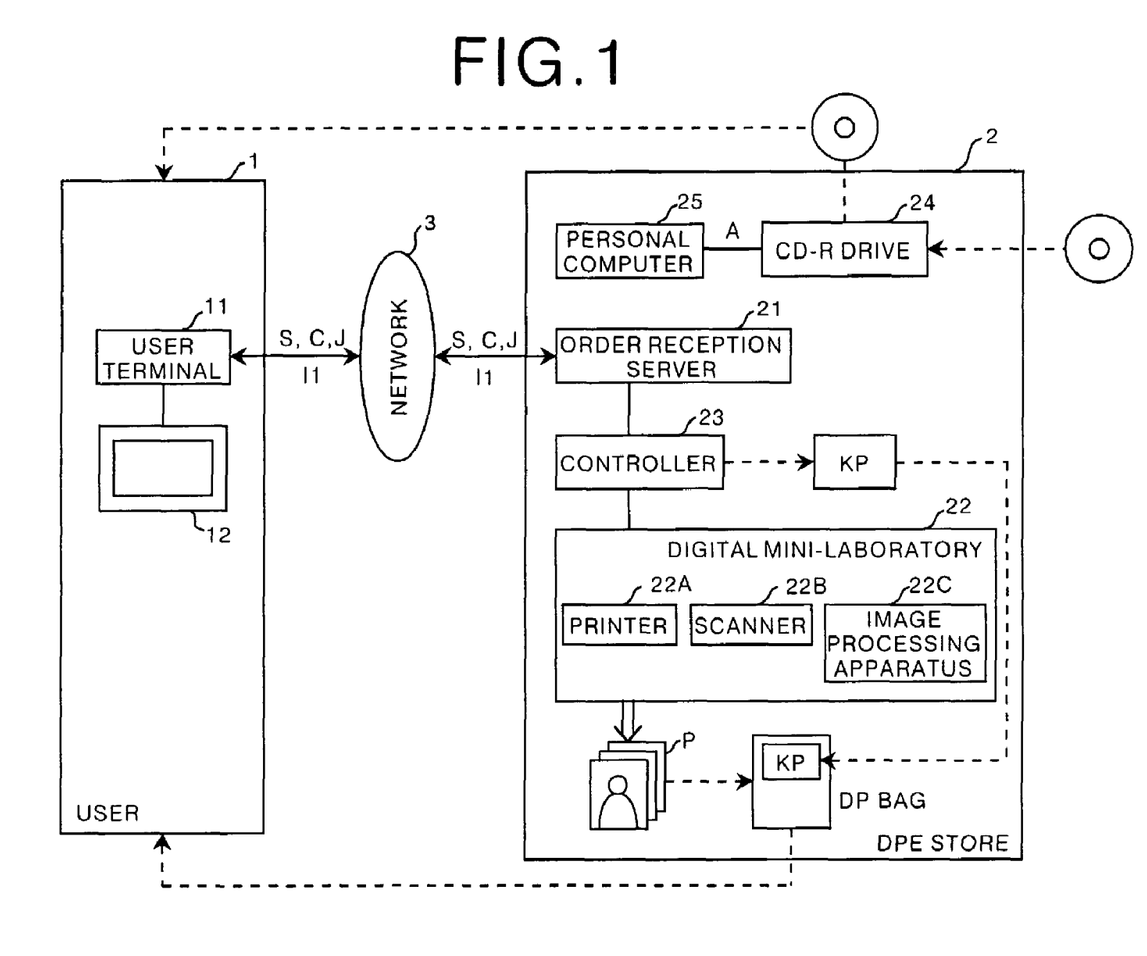
FIG. 1 is a block diagram showing a configuration of a print order system in an embodiment of the present invention.

Hereinafter, an embodiment of the present invention will be explained with reference to the accompanying drawings. FIG. 1 is a block diagram showing a configuration of a print order system of an embodiment of the present invention. As shown in FIG. 1, the print order system in this embodiment exchanges data and prints between a user 1 and a DPE store 2. In FIG. 1, the flow of data is shown by solid lines and the flow of objects is shown by broken lines.

The user 1 has a personal computer which acts as a user terminal 11. The personal computer comprises a hard disc, a monitor 12, a keyboard, a mouse, a CD-ROM drive, and a PC card slot for reading image data from a recording medium for a digital camera (such as Smart Media and Compact Flash (registered trade marks)). The personal computer can place a print order from the DPE store 2 via a network 3 such as the Internet, as will be explained later. If the user does not have a personal computer, the user can use a terminal installed at a service station or the like dedicated to placing orders.

The DPE store 2 has an order reception server 21 for receiving the print order, a digital mini-laboratory 22 for generating a print or prints P (hereinafter referred to as the prints P) based on an image data set or image data sets S (hereinafter referred to as the image data sets S) sent from the user terminal 11 via the network 3 at the time the user places the print order, a controller 23 for controlling the order reception server 21 and the digital mini-laboratory 22, and a personal computer 25 to which a CD-R drive 24 for recording information in a CD-R is connected.

The order reception server 21 has a function of sending to the user terminal 11 DPE store information I1 based on or without a request of the user terminal 11 when the user 1 accesses the order reception server 21. The DPE store information I1 represents a menu showing the content of a printing service provided by the DPE store 2 (such as ordinary printing, special printing (generating picture postcards or the like), and printing on a T-shirt or a mug cup, for example), a charge per print, and the time of delivery, for example. The order reception server also has a function of storing order information C sent from the user terminal 11 as will be explained later. The order reception server 21 is always connected to the network 3.

The digital mini-laboratory 22 comprises a printer 22A for generating the prints P based on the image data sets S, a scanner 22B for scanning a negative film, and an image processing apparatus 22C for carrying out image processing on the image data sets S based on an image processing condition or image processing conditions J (hereinafter referred to as the image processing conditions J) added to the image data sets S as will be explained later. The digital mini-laboratory 22 has a function of writing the image data sets S in a recording medium such as a CD-R. A color reproduction range of the monitor 12 of the user terminal 11 is approximately the same as a color reproduction range of the printer 22A.

The controller 23 comprises a computer and a printer, and manages and controls the order reception server 21 and the digital mini-laboratory 22. An operator at the DPE store 2 operates the controller 23. The controller 23 outputs label KP on which the charge per print, the name of the user, the content of the prints, and an order reception ID assigned to each item of the order information C are printed, for example. By pasting the label KP on a DP bag containing the prints P, the prints P are easily classified and the user 1 is easily invoiced.

The CD-R drive 24 is connected to the personal computer 25. The CD-R drive records access information A used for accessing the order reception server 21 of the DPE store 2 in a CD-R recorded with viewer software having functions of image display, order information generation, image processing condition setting, and transfer. The IP address or URL of the order reception server 21 is used as the access information A. The CD-R is provided to the user 1 at the time the user purchases the digital camera, when the user 1 visits the DPE store 2, or on the street, for example.

The user 1 sets the CD-R in the CD-ROM drive (not shown) of the user terminal 11, and installs the viewer software recorded in the CD-R to the user terminal 11. At this time, the access information A recorded in the CD-R is input to the viewer software. By installing the viewer software, the user 1 can browse through and manipulate the image data sets S, generate the order information C, set the image processing conditions J, and place the print order. At the time of order placement, the user terminal 11 accesses the order reception server 21 of the DPE store 2 corresponding to the access information A by using the function of the viewer software, and the order information C and the image data sets S to be printed are sent thereto.

Figure 2:
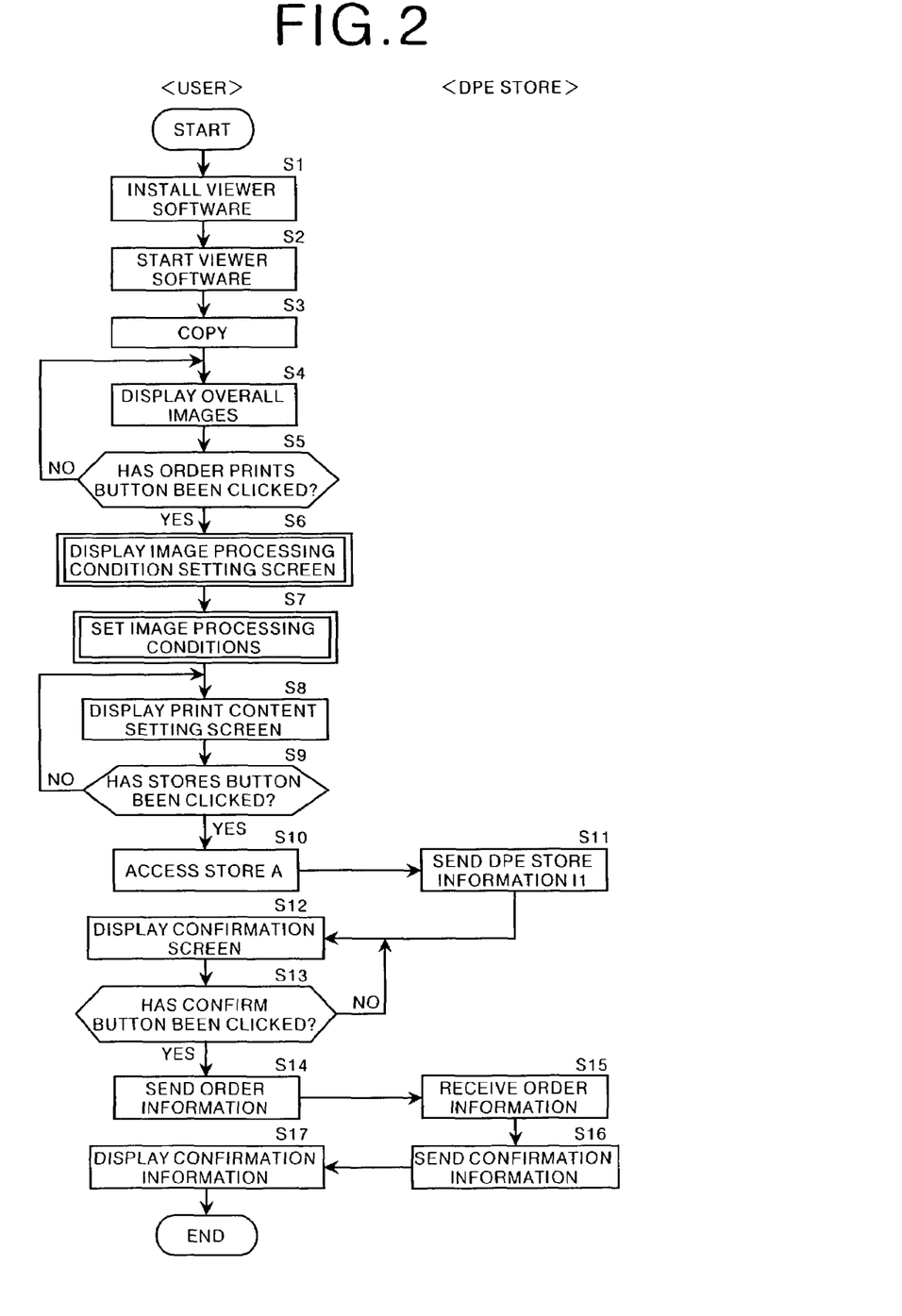
FIG. 2 is a flow chart showing a procedure carried out in the embodiment.

The operation of this embodiment will be explained next. FIG. 2 is a flow chart showing a procedure carried out in this embodiment. The user 1 has been provided with the CD-R recorded with the access information A of the DPE store 2 (named DPE store A). Ordinary printing regarding the image data sets S owned by the user 1 (that is, printing by the printer 22A of the digital mini-laboratory 22) is carried out in this embodiment.

The user 1 installs the viewer software from the CD-R to the user terminal 11 (Step S1). At this time, the access information A is input to the viewer software. The user 1 starts the viewer software (Step S2), and sets the recording medium recorded with the image data sets S obtained by the digital camera in the PC card slot of the user terminal 11. When the user 1 clicks a Copy button (not shown) of the viewer software, the image data sets S in the recording medium are copied in the hard disc of the user terminal 11 (Step S3). At this time, a folder for storing the image data sets S is automatically generated. When the user 1 selects the folder and instructs overall display, thumbnail images of the image data sets S are then displayed on the monitor 12 (Step S4).

Figure 3:
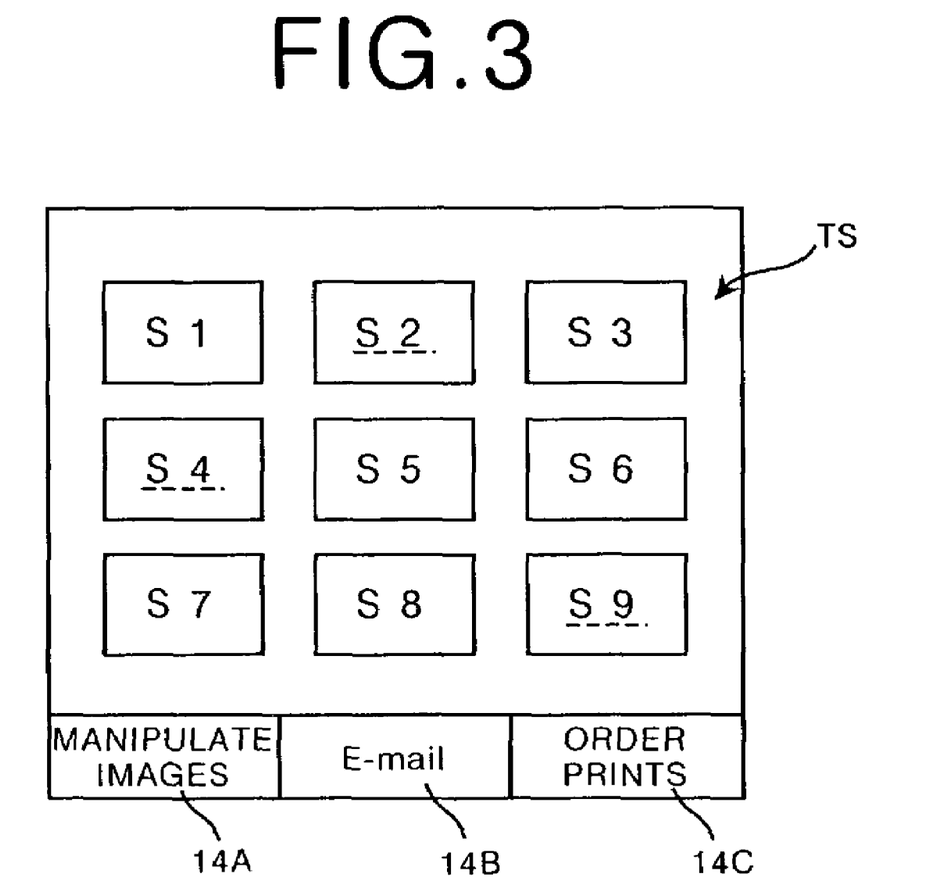
FIG. 3 shows an overall display screen.

FIG. 3 shows an overall display screen on the monitor 12. As shown in FIG. 3, thumbnail images TS of the image data sets S in the folder, a Manipulate Images button 14A for carrying out image manipulation, an E-mail button 14B for sending an E-mail message attached with images, and an Order Prints button 14C for placing a print order are shown in the overall display screen. In FIG. 3, nine of the thumbnail images TS corresponding to the image data sets S (hereinafter referred to as image data sets S1 to S9) are shown. However, more of the thumbnail images TS can be displayed by scrolling the overall display screen. The Manipulate Images button 14A is used for carrying out image manipulation such as trimming, lightness or tone correction, and caption insertion on any one of images represented by the image data sets S selected from the thumbnail images TS. The image represented by the image data set S selected from the thumbnail images can be manipulated by clicking the button 14A.

The image or images to be printed (represented by the image data sets S2, S4, and S9 in this case) are then selected. Whether or not the Order Prints button 14C has been clicked is then judged (Step S5). If a result at Step S5 is affirmative, an image processing condition setting screen is displayed on the monitor 12 (Step S6), and image processing condition setting is carried out (Step S7). Hereinafter, how the image processing conditions J are set at Step S7 will be explained with reference to display of the image processing condition setting screen at Step S6.

Figure 4:
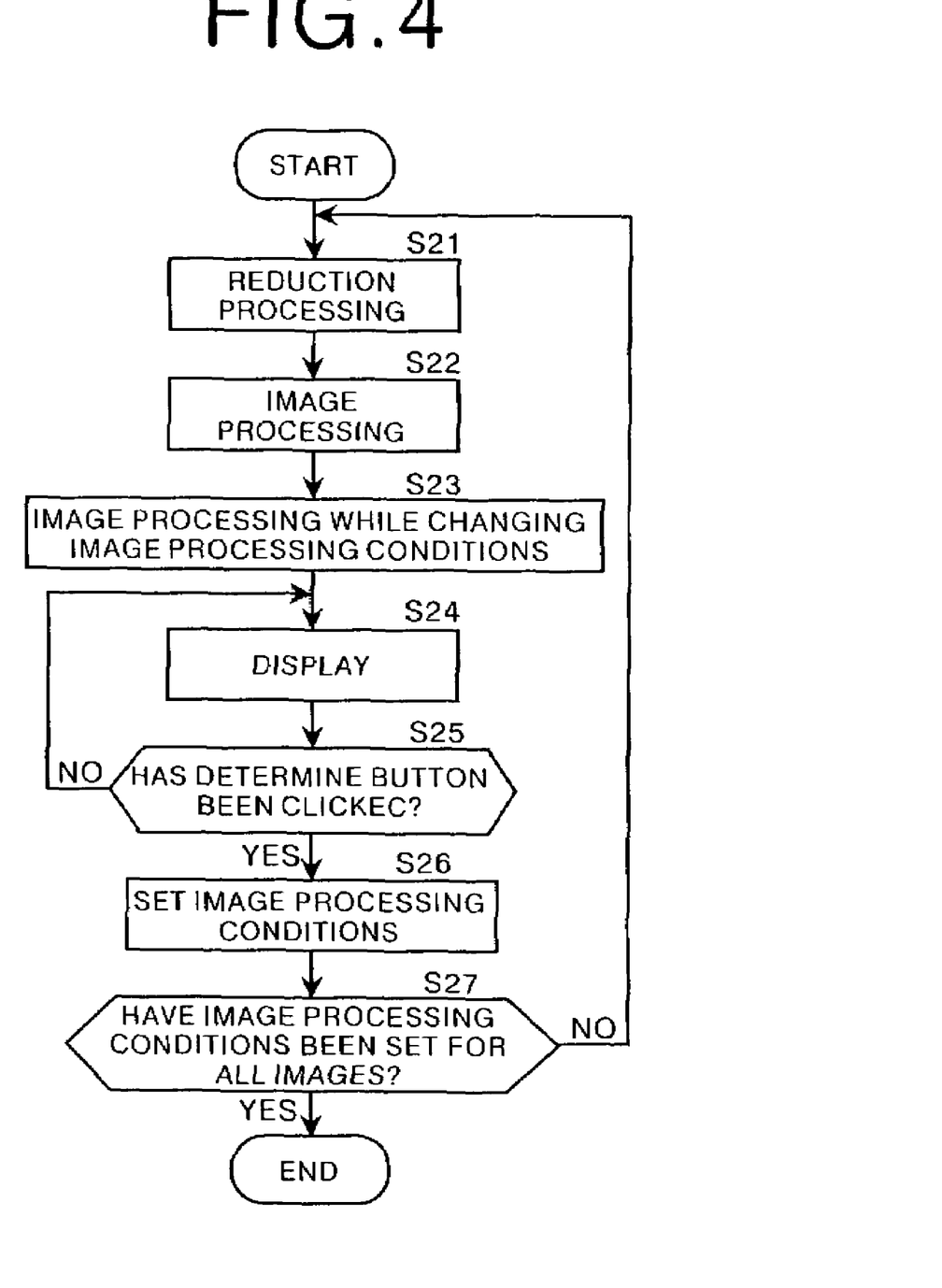
FIG. 4 is a flow chart showing a procedure related to image processing condition setting.

FIG. 4 is a flow chart showing a procedure for the image processing condition setting. As shown in FIG. 4, a reduced image data set representing a reduced image is generated (Step S21) by carrying out reduction processing on one of the image data sets S (the image data set S2, for example) selected for printing in the overall display screen. Density conversion processing, white balance processing, gradation conversion processing, and sharpness processing is carried out on the reduced image data set, and processed reduced image data sets representing processed reduced images are then obtained (Step S22). The image processing described above is carried out to cause the respective images represented by the processed reduced image data sets to have a predetermined density, predetermined white balance, a predetermined tone, and predetermined sharpness. The image processing conditions J for the image processing of these types carried out at Step S22 are automatically set, based on the reduced image data set. The image processing conditions J used at Step S22 may be predetermined. Alternatively, no image processing may be carried out at Step S22.

The density conversion processing, the white balance processing, the gradation conversion processing, and the sharpness processing is then carried out on the reduced image data set while variously changing the image processing conditions J used therefor. In this manner, processed reduced image data sets representing processed reduced images having been subjected to the image processing of different levels are obtained (Step S23), in addition to the processed reduced image data sets generated at Step S22. More specifically, for the density conversion processing, the processed reduced image data sets having densities lower and higher than the density of the processed reduced image data set obtained at Step S22 by a predetermined amount are generated. For the white balance processing, the processed reduced image data sets having white balance adjusted respectively for yellow, blue, green, and red with reference to the white balance of the processed reduced image data set obtained at Step S22 are generated. For the gradation conversion processing, the processed reduced image data sets having tones softer and harder than the tone of the processed reduced image data set obtained at Step S22 by a predetermined amount are generated. For the sharpness processing, the processed reduced image data sets having sharpness stronger and weaker than the sharpness of the processed reduced image data set obtained at Step S22 by a predetermined amount are generated. The processed reduced image data sets are all displayed on the monitor 12 as the image processing condition setting screen for each of the types of image processing (Step S24).

Figure 5:
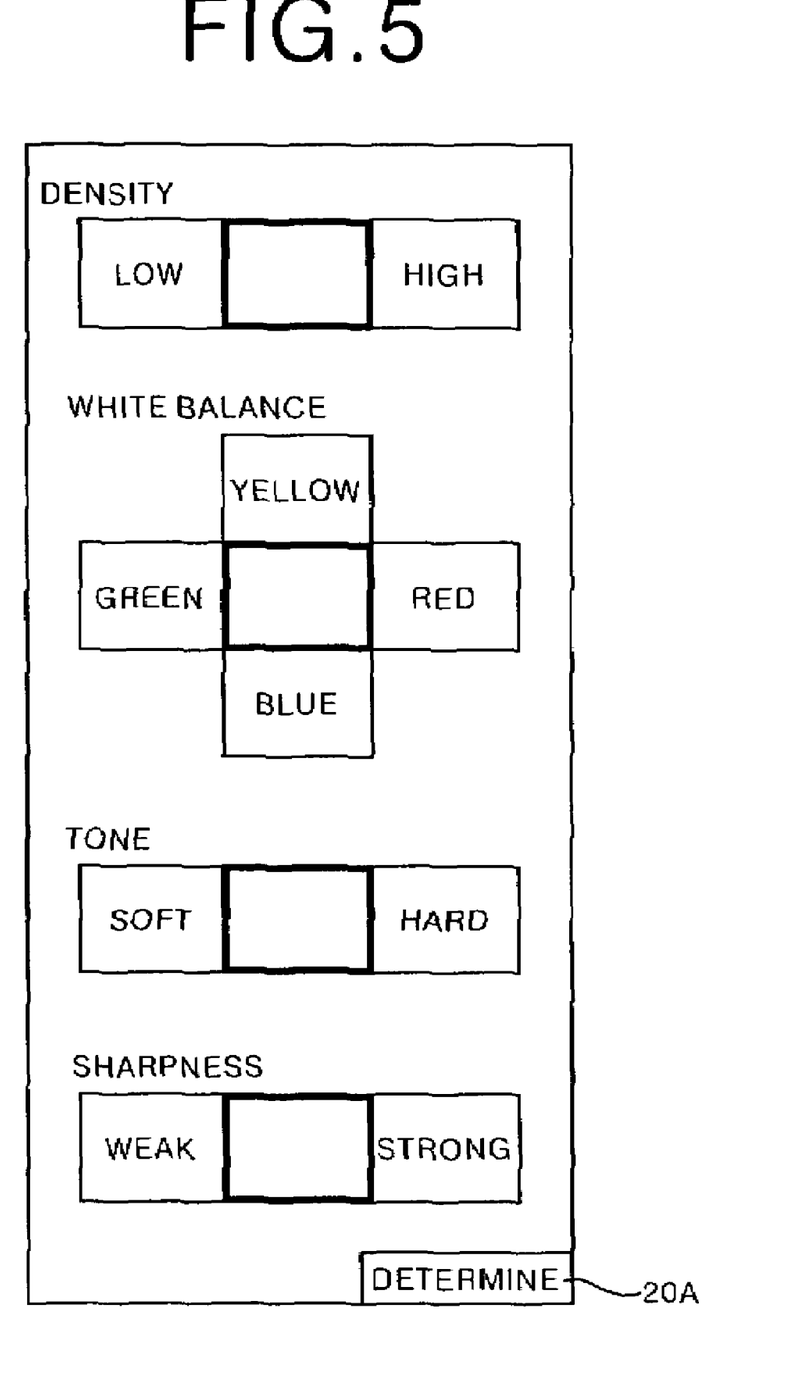
FIG. 5 shows an image processing condition setting screen.

FIG. 5 shows the image processing condition setting screen. As shown in FIG. 5, the processed reduced images respectively having been subjected to the 3 levels of density conversion, gradation conversion and sharpness processing and the 5 levels of white balance processing are displayed in the image processing condition setting screen. A Determine button 20A is also shown in the screen for determining a selected one of the image processing conditions. The images in bold frames are the processed reduced images represented by the processed reduced image data sets generated at Step S22. Since it is difficult for all the processed reduced images to be displayed altogether on the monitor 12, the images are preferably displayed by scrolling the screen with a scroll bar. Alternatively, the images may be displayed in separate screens for the respective types of image processing.

For each of the types of image processing in the image processing condition setting screen, the user 1 selects one of the processed reduced images generated by using a desired one of the image processing conditions representing the different levels. Whether or not the Determine button 20A has been clicked after the selection of the desired processed reduced image for each of the types of image processing is then judged (Step S25). If a result at Step S25 is affirmative, the image processing conditions J for the image processing carried out on the desired processed reduced image data sets that have been selected are set for the corresponding types of image processing (Step S26). The image processing conditions J are added to a header of the corresponding image data set S (the image data set S2 in this case). The image processing conditions J may be stored in the user terminal, separately from the corresponding image data set. If the result at Step S25 is negative, the procedure returns to Step S24. Whether or not the image processing conditions J have been set for all the images selected in the overall display screen (the images represented by the image data sets S2, S4, and S9) is then judged (Step S27). If a result at Step S27 is negative, the procedure returns to Step S21, and the procedure from Step S21 to Step S27 is then repeated. If the result at Step S27 is affirmative, the image processing condition setting has been completed.

When the procedure at Step S7 shown in FIG. 2 ends, a print content setting screen for setting the content of printing is shown on the monitor 12 (Step S8).

Figure 6:
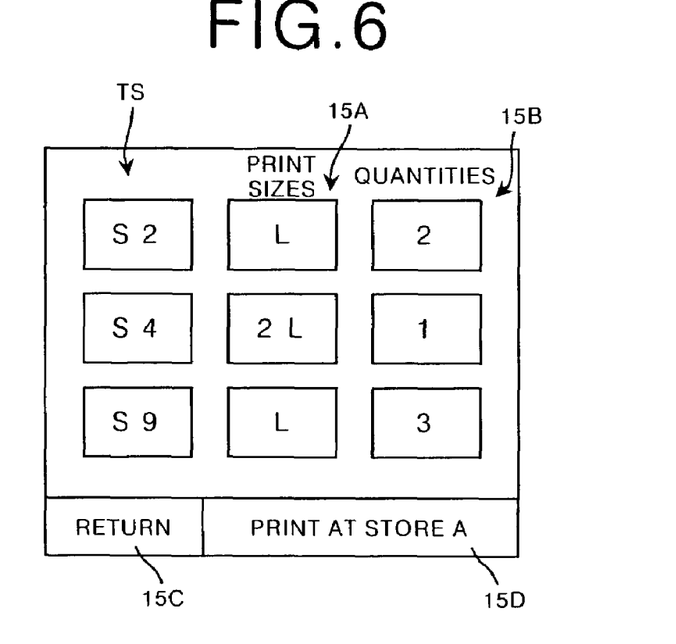
FIG. 6 shows a printing content setting screen.

FIG. 6 shows the print content setting screen. As shown in FIG. 6, the thumbnail images TS of the image data sets S2, S4, and S9 selected in the overall display screen, print size input fields 15A, quantity input fields 15B, a Return button 15C for returning to the overall display screen, and a Stores button 15D for accessing the DPE store 2 for placing the print order are shown in the print content setting screen. It is preferable for the thumbnail images TS displayed in the print content setting screen to be the thumbnail images having been subjected to the image processing using the image processing conditions J set at Step S7.

Since the user 1 received the CD-R recorded with the viewer software and the access information A and installed the viewer software from the CD-R to the user terminal 11, "Print at Store A" is shown in the Stores button 15D so that the user 1 accesses only the DPE store A for printing.

The user 1 inputs the print sizes and the quantities in the print size input fields 15A and the quantity input fields 15B for all the selected image data sets S. Since only predetermined print sizes are available, the print size input fields 15A may comprise a pull-down menu. The user can re-select the images in the overall display screen by clicking the Return button 15C.

Whether or not the Stores button 15D has been clicked is then judged (Step S9). If a result at Step S9 is affirmative, the order reception server 21 of the DPE store A is accessed by the user terminal 11 according to the function of the viewer software (Step S10). After being accessed, the order reception server 21 sends the DPE store information I1 regarding the DPE store 2 (the DPE store A) to the user terminal 11 (Step S11). The DPE store information I1 may be sent automatically after the access or by an instruction from the user terminal 11 after the access.

Figure 7:
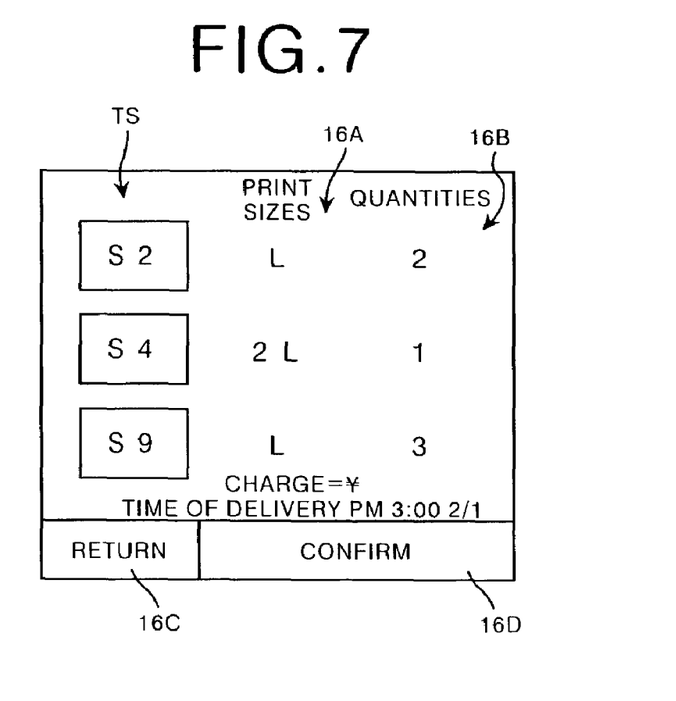
FIG. 7 shows a confirmation screen.

The user terminal 11 receives the DPE store information I1, and displays a confirmation screen showing a charge for printing based on the print sizes and the quantities input by the user and the expected time of delivery (Step S12). FIG. 7 shows the confirmation screen. As shown in FIG. 7, the thumbnail images TS that are the same as in the print content setting screen are shown in the confirmation screen. Fields 16A for displaying the confirmed print sizes, fields 16B for displaying the confirmed quantities, a Return button 16C for returning to the print content setting screen, and a Confirm button 16D for confirming the print order are also shown in the confirmation screen.

The user 1 can confirm the charge and the expected time of delivery while viewing the confirmation screen. If necessary, the user 1 can change the print sizes and the quantities in the print content setting screen again by clicking the Return button 16C.

Whether or not the Confirm button has been clicked is then judged (Step S13). If a result at Step S13 is affirmative, the order information C describing the content of the print order is sent to the order reception server 21 of the DPE store A (Step S14), together with the image data sets S to be printed (S2, S4, and S9) and the image processing conditions J set at Step S7. The order information C includes the file names of the image data sets S, the print sizes, the quantities, and information on the user 1 (such as the name, the address, and the phone number of the user 1).

The order reception server 21 receives the order information C and the image data sets S including the image processing conditions J (Step S15). The order reception server 21 also generates confirmation information including an order reception ID assigned to each item of the order information C for identification of the print order, the charge, and the time of delivery, and sends the confirmation information to the user terminal 11 (Step S16). The time of delivery refers to the time of completion of printing that is determined based on the time of reception of the order information C by the order reception server 21. For example, if the order information C is received during business hours of the DPE store 2, the time of delivery is determined to be 3 hours after the reception. If the order information C is received outside the business hours, the time of delivery is determined to be the starting time of the next operating day. The confirmation information is displayed on the user terminal 11 (Step S17) to end the procedure.

In the DPE store 2, the controller 23 regularly checks whether or not the order reception server 21 has received the order information C. In the case where the order information C has been received, the reception of the order information C is printed as an order reception sheet and notified to the operator. The operator checks the reception of the order information C at intervals calculated by subtracting the processing time from 3 hours (that is, at every 2 hours if the processing time is 1 hour) in the case where the time of delivery is 3 hours after the reception of the order information C, and generates the prints P by using the controller 23, based on the order information C received by the order reception server 21. In other words, the operator operates a starting switch (not shown) of the controller 23 in order to send the order information C and the image data sets S from the order reception server 21 to the digital mini-laboratory 22. In this manner, the order information C and the image data sets S are sent from the user terminal 11 to the order reception server 21.

Figure 8:
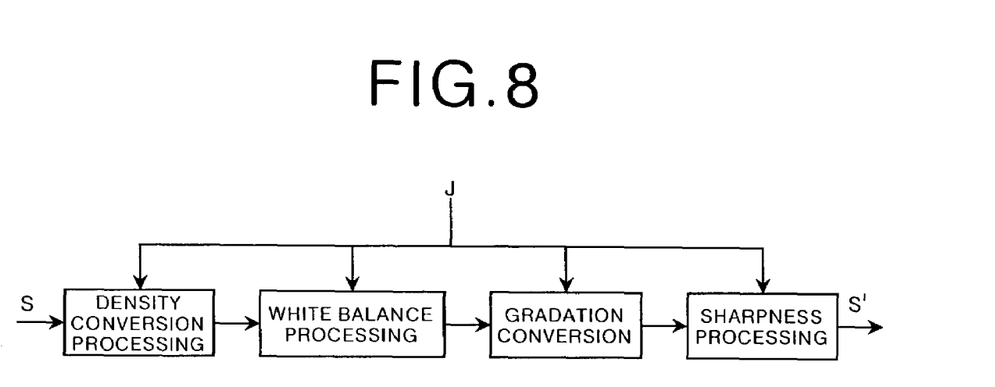
FIG. 8 shows image processing carried out in an image processing apparatus.

In the digital mini-laboratory 22, the image processing apparatus 22C carries out the image processing on the image data sets S, based on the image processing conditions J added to the image data sets S. Processed image data sets S' are generated in this manner. FIG. 8 shows how the image processing is carried out in the image processing apparatus 22C. As shown in FIG. 8, the density conversion processing is carried out on the image data sets S based on one of the image processing conditions J, and the white balance processing, the gradation conversion processing, and the sharpness processing is further carried out according to the rest of the image processing conditions J to generate the processed image data sets S'.

The printer 22A of the digital mini-laboratory 22 prints the processed image data sets S' according to the order information C. In this manner, the prints P are generated. At this time, the order reception ID is printed on the backside of each of the prints P, and the prints P are sorted. The controller 23 prints the name of the user, the content of the prints P, the charge, the order reception ID, and the like on the label KP. The label KP is pasted on the DP bag containing the sorted prints P. The prints P are put in the DP bag corresponding to the order reception ID. The user 1 visits the DPE store 2 after the time of delivery, and receives the prints P by paying the charge. The prints P may be delivered or mailed to the user 1.

As has been described above, according to the present invention, the processed reduced images having been subjected to the image processing at different levels are shown on the monitor 12 of the user terminal 11. Therefore, the user 1 can confirm the finish of the prints by viewing the monitor 12. Since the monitor 12 of the user terminal 11 is larger than the monitor of the digital camera of the user, the finish can be confirmed easily. Furthermore, since the processed reduced images having been subjected to the image processing at different levels can be displayed on the monitor 12, the user 1 can easily select the processed reduced images having been subjected to the image processing producing the desired finish. Moreover, the image processing conditions J for the selected processed reduced images are sent to the order reception server 21 and the image processing is carried out on the image data sets S according to the image processing conditions J, the prints P reflecting the desired finish of the user 1 can be generated.

The DPE store 2 simply carries out the image processing on the image data sets S according to the image processing conditions J sent thereto. Therefore, the operator at the DPE store 2 does not need to carry out complex image processing and the burden thereon can be reduced. As a result, the DPE store 2 can reduce the human cost. Moreover, since the processing time can be shortened, the printing cost can also be cut.

In the above embodiment, the reduced image data sets are generated from the image data sets S, and the image processing is carried out on the reduced image data sets to be displayed on the monitor 12. In this manner, the amount of operation necessary for the image processing can be reduced. However, the image processing may be carried out directly on the image data sets S to be displayed on the monitor 12, without generation of the reduced image data sets.

In the above embodiment, the image processing conditions J are set for all the image data sets S to be printed. However, the image processing conditions J may be set for only one of the image data sets S to be printed.

The number of the levels is three for the density conversion processing, the gradation conversion processing, and the sharpness processing while the number of the levels is five for the white balance processing when the processed reduced images are generated in the above embodiment. However, the number of the levels may be increased to generate the processed reduced image data sets of more levels. Alternatively, the number of the levels may be only two.

In the above embodiment, the processed reduced image data sets are generated by carrying out the image processing at the different levels for the respective types of image processing. However, the processed reduced image data sets may be generated by carrying out the image processing at different levels for only a portion of the types of the image processing (such as for white balance processing only). In this case, for the other types of image processing, the processed reduced image data sets generated at Step S22 are displayed on the monitor 12.

In the above embodiment, the density conversion processing, the white balance processing, the gradation conversion processing, and the sharpness processing is carried out as the image processing. However, the image processing to be carried out is not limited to the image processing of these types.

The DPE store 2 has only the digital mini-laboratory 22 in the above embodiment. Therefore, only ordinary printing of the image data sets S can be carried out at the DPE store 2. Therefore, it is preferable for the DPE store 2 to collaborate with a printing service provider capable of generating picture postcards and T-shirts with prints thereon, for example. In this manner, various types of printing services can be provided.

In the above embodiment, the print order for the prints P is placed from the DPE store 2. However, any printing service provider such as a laboratory dedicated to printing and not having a store can comprise the print order system of the present invention.

A skilled artisan would know that computer readable media is not limited to any specific type of storage device and includes any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. A print order system comprising:
    an order reception server installed at a printing service provider having a photographic printer to print image data, the order reception server capable of receiving the image data and order information regarding the image data via a network; and
    an order terminal connected to the order reception server via the network, the order terminal generating the order information and placing a print order regarding the image data by transferring the order information to the order reception server while directly accessing the order reception server,
    the order terminal generating processed image data by carrying out one or more types of image processing at different levels on the image data regarding which the print order is placed, by using different image processing conditions,
    displaying processed images represented by the processed image data on display means for the type or each of the types of the image processing, receiving selection of a desired one of the processed images for the type or each of the types of the image processing, and
    sending to the order reception server the image processing condition or conditions used for generating the desired processed image or images that have been selected, together with the order information and the image data, and
    the order reception server receiving the image processing condition or conditions for the type or types of the image processing, and
    being connected to image processing means for carrying out the image processing on the image data based on the image processing condition or conditions for the type or types of the image processing,
    wherein generation of the processed image data, display of the processed images, reception of the selection of the desired processed image for the type of or each of the types of image processing, and transfer of the image processing condition or conditions are carried out by a program installed in the order terminal, the program causing a computer to execute the procedures of generation of the processed image data, display of the processed images, reception of the selection of the desired processed image for the type or each of the types of the image processing, and transfer of the image processing condition or conditions.

2. A print order system as defined in claim 1, wherein the order terminal generates the processed image data by carrying out the type or types of image processing on reduced image data representing a reduced image of an image represented by the image data.

3. A print order system as defined in claim 1, wherein the display means has a color reproduction range that substantially matches a color reproduction range of the photographic printer.

4. An order terminal connected via a network to an order reception server capable of receiving order information regarding image data, the order reception server being installed at a printing service provider having a photographic printer to print the image data, the order terminal generating the order information and placing a print order regarding the image data by transferring the order information to an order reception server at a specified printing service provider while directly accessing the order reception server, wherein
    the order terminal generates processed image data by carrying out one or more types of image processing at different levels on the image data regarding which the print order is placed, by using different image processing conditions,
    displays processed images represented by the processed image data on display means for the type of or each of the types of the image processing,
    receives selection of a desired one of the processed images for the type of or each of the types of the image processing, and sends to the order reception server the image processing condition or conditions used for generating the processed image or images that have been selected, together with the order information and the image data, wherein generation of the processed image data, display of the processed images, reception of the selection of the desired processed image for the type or each of the types of the image processing, and transfer of the image processing condition or conditions are carried out by a program installed in the order terminal, the program causing a computer to execute the procedures of generation of the processed image data, display of the processed images, reception of the selection of the desired processed image for the type or each of the types of the image processing, and transfer of the image processing condition or conditions.

5. An order terminal as defined in claim 4, wherein the order terminal generates the processed image data by carrying out the type or types of the image processing on reduced image data representing a reduced image of an image represented by the image data.

6. An order terminal as defined in claim 4, wherein the display means has a color reproduction range that substantially matches a color reproduction range of the photographic printer.

7. A printing system installed at a printing service provider, the printing system comprising:

a photographic printer for printing image data; and an order reception server capable of directly receiving the order information generated by the order terminal defined in claim 4 via a network, wherein the printing system further comprises image processing means for carrying out the image processing on the image data, based on the image processing condition or conditions for the type or types of the image processing.

8. A computer-readable recording medium storing a program that causes a computer to execute the procedures of:

receiving from the order terminal defined in claim 4 the image processing condition or conditions for the type or types of the image processing, and carrying out the image processing on the image data based on the image processing condition or conditions for the type or types of the image processing.

9. A computer-readable recording medium storing a program that causes a computer to execute the procedures of generating order information regarding image data, and transferring the order information to an order reception server installed at a printing service provider while directly accessing the order reception server, the program further comprising the procedures of:

transferring image processing condition or conditions for one or more types of the image processing, generating processed image data by carrying out one or more types of image processing at different levels on the image data regarding which a print order is placed, by using different image processing conditions, displaying processed images represented by the processed image data on display means for the type or each of the types of the image processing, receiving selection of a desired one of the processed images for the type or each of the types of the image processing, and sending to the order reception server the image processing condition or conditions used for generating the desired processed image or images that have been selected, together with the order information and the image data, wherein image processing is carried out on the image data based on the image processing condition or conditions for the one or more types of the image processing.

* * * * *